US010743456B2

(12) United States Patent
Hulicsko et al.

(10) Patent No.: US 10,743,456 B2
(45) Date of Patent: Aug. 18, 2020

(54) GROUND-ENGAGING FARM IMPLEMENT WITH AXLE SUSPENSION TO ENHANCE FIELD SURFACE CONTACT

(71) Applicant: Rite Way Mfg. Co. Ltd., Regina (CA)

(72) Inventors: Les Hulicsko, Regina (CA); Robert Skinner, Regina (CA)

(73) Assignee: Rite Way MFG. CO. LTD., Regina (CA)

( * ) Notice: Subject to any disclaimer, the term of this patent is extended or adjusted under 35 U.S.C. 154(b) by 0 days.

(21) Appl. No.: 14/986,277

(22) Filed: Dec. 31, 2015

(65) Prior Publication Data
US 2016/0192575 A1    Jul. 7, 2016

(30) Foreign Application Priority Data

Jan. 2, 2015   (CA) ...................................... 2876627

(51) Int. Cl.
*A01B 63/16*      (2006.01)
*A01B 63/22*      (2006.01)

(52) U.S. Cl.
CPC .............. *A01B 63/16* (2013.01); *A01B 63/22* (2013.01)

(58) Field of Classification Search
CPC .................................. A01B 63/16; A01B 63/22
See application file for complete search history.

(56) References Cited

U.S. PATENT DOCUMENTS

| 4,519,460 | A | * | 5/1985 | Gust | A01B 29/04 111/136 |
|---|---|---|---|---|---|
| 4,594,951 | A | * | 6/1986 | Grataloup | A01B 15/20 111/195 |
| 4,964,480 | A | * | 10/1990 | Kopczynski | B60G 21/04 180/22 |
| 4,974,684 | A | * | 12/1990 | Stevens | A01B 73/046 172/311 |
| 5,139,314 | A | * | 8/1992 | Deckler | B60B 11/08 180/24.03 |
| 5,235,922 | A | * | 8/1993 | Deckler | A01C 5/064 111/137 |
| 5,871,218 | A | * | 2/1999 | Lepage | B62B 3/1492 280/124.111 |
| 8,186,449 | B2 | * | 5/2012 | Hackert | A01B 63/16 172/288 |
| 2007/0201780 | A1 | * | 8/2007 | Connell | A01B 63/16 384/275 |
| 2011/0100657 | A1 | * | 5/2011 | Connors | A01B 73/00 172/439 |
| 2013/0199807 | A1 | * | 8/2013 | Hoffman | A01B 49/027 172/1 |
| 2014/0060035 | A1 | * | 3/2014 | Barfels | F15B 1/024 60/484 |
| 2014/0116735 | A1 | * | 5/2014 | Bassett | A01B 61/044 172/2 |
| 2016/0192575 | A1 | * | 7/2016 | Hulicsko | A01B 63/22 172/395 |

* cited by examiner

*Primary Examiner* — Jamie L McGowan
(74) *Attorney, Agent, or Firm* — Trego, Hines & Ladenheim, PLLC

(57) ABSTRACT

An improved farm implement includes a frame that can be coupled to the hitch of a power unit. The weight of the unit supported by one or more wheels that are pivotally mounted to the frame. The implement further includes a suspension system that is configured to vary the vertical positioning of one or more support wheels.

10 Claims, 8 Drawing Sheets

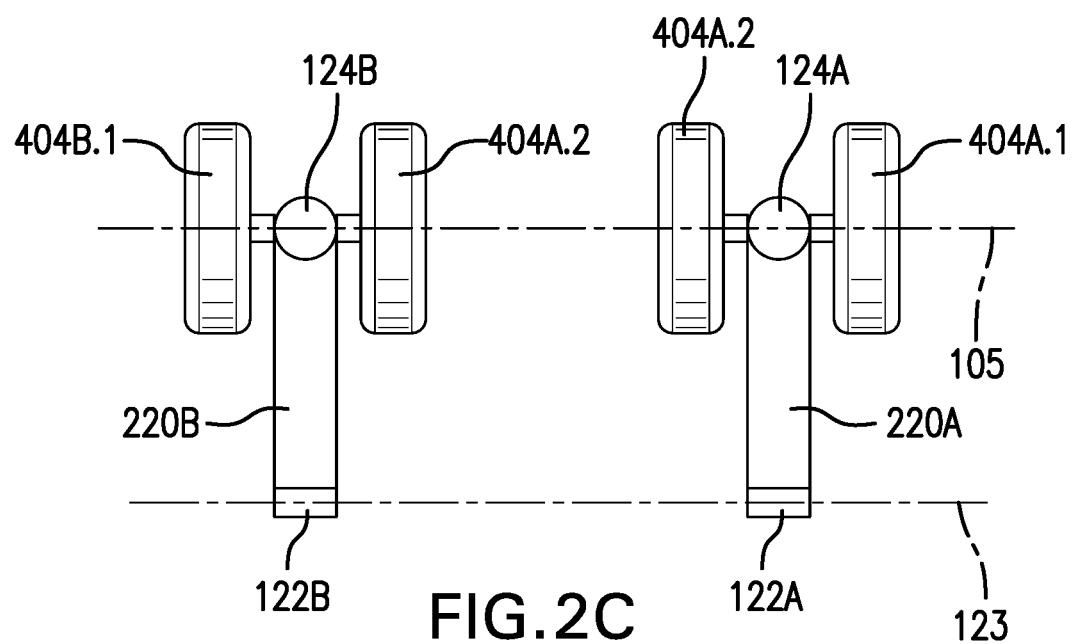

GROUND-ENGAGING FARM IMPLEMENT WITH AXLE SUSPENSION TO ENHANCE FIELD SURFACE CONTACT

FIELD OF THE INVENTION

The present invention relates to ground-engaging farm implements, and more particularly, to ground-engaging farm implements having air or spring suspension.

BACKGROUND OF THE INVENTION

In present-day farming, a large variety of ground-engaging farm implements such as, for example, plows, harrows, tillers, etc., are employed for cultivating agricultural land. As farm sizes grow and agricultural competitiveness increases, operational efficiency of the work done for cultivating the agricultural land becomes increasingly important. Large present-day farm implements, towed by powerful power units, enable a single operator to cover many acres of land per hour.

Unfortunately, with increasing size of the ground-engaging farm implements and increasing speed of operating the same, the lack of suspension of present-day ground-engaging farm implements results, when encountering un-even ground, reduced consistency of the ground contact of the ground-engaging tool, increasing wear of the farm implement and the hitch, as well as decreasing the operator comfort.

It is desirable to provide a ground-engaging farm implement having an air or spring suspension that substantially increases the consistency of the ground contact of the ground-engaging tool when encountering un-even ground.

It is also desirable to provide a ground-engaging farm implement having an air or spring suspension that enables increased speed of operation.

SUMMARY OF THE INVENTION

An object of the present invention is to provide a ground-engaging farm implement having an air or spring suspension that substantially increases the consistency of the ground contact of the ground-engaging tool when encountering un-even ground.

Another object of the present invention is to provide a ground-engaging farm implement having an air or spring suspension that enables increased speed of operation.

According to one aspect of the present invention, there is provided a ground-engaging farm implement. A support frame of the ground-engaging farm implement has a front end portion which is adapted for being coupled to a hitch of a power unit. At least one ground-engaging tool is mounted to the support frame. A substantial portion of the weight of the farm implement is supported by at least one support wheel. A wheel support structure having the at least one support wheel rotatably movable mounted thereto is pivotally movable mounted to the support frame such that the at least one support wheel is enabled to substantially vertically move a predetermined distance with respect to the support frame. A suspension air bag of an air suspension system is interposed between the support frame and the wheel support structure for controlling the vertical movement of the at least one support wheel.

An advantage of the present invention is that it provides a ground-engaging farm implement having an air or spring suspension that substantially increases the consistency of the ground contact of the ground-engaging tool when encountering un-even ground.

A further advantage of the present invention is that it provides a ground-engaging farm implement having an air or spring suspension that enables increased speed of operation.

BRIEF DESCRIPTION OF THE DRAWINGS

A preferred embodiment of the present invention is described below with reference to the accompanying drawings, in which.

DETAILED DESCRIPTION OF ILLUSTRATED EMBODIMENTS

Unless defined otherwise, all technical and scientific terms used herein have the same meaning as commonly understood by one of ordinary skill in the art to which the invention belongs. Although any methods and materials similar or equivalent to those described herein can be used in the practice or testing of the present invention, the preferred methods and materials are now described.

While the description of the preferred embodiments hereinbelow is with reference to a tiller having a center frame supported by two wheels, it will become evident to those skilled in the art that the embodiments of the invention are not limited thereto, but are also adaptable for use with various other ground-engaging farm implements such as, for example, plows, harrows, tillers, etc. Furthermore, the embodiments of the invention are also adaptable to ground-engaging farm implements having a different number of wheels supporting the center frame.

It is noted that, while the preferred embodiments employ air suspension, other types of suspension may also be employed such as, for example, coil spring suspension, leaf spring suspension, torsion beam suspension, or hydro-pneumatic suspension.

Referring to FIGS. 1A to 1G, a ground-engaging farm implement 100 according to a preferred embodiment of the invention is provided. Support frame 102 of the ground-engaging farm implement 100 has a front end portion 102A which is adapted—coupler 102B—for being coupled to a hitch of a power unit (not shown) or other heavy equipment such as, for example, a bulldozer. In operation, the power unit tows the ground-engaging farm implement 100 in a forward direction, as indicated by the large block arrow in FIGS. 1A and 1B. A ground-engaging tool such as, for example, tines 110 of a tiller, as illustrated in FIGS. 1A to 1D, are mounted to the support frame 102 and extension wings 106A and 106B. The extension wings 106A and 106B are pivotally movable mounted to the support frame 102 in order to enable folding of the same for storage and transport of the ground-engaging farm implement 100. The support frame 102 is supported by support wheels 104A and 104B such that a substantial portion of the weight of the farm implement is carried by the support wheels 104A and 104B.

Figure 1A:
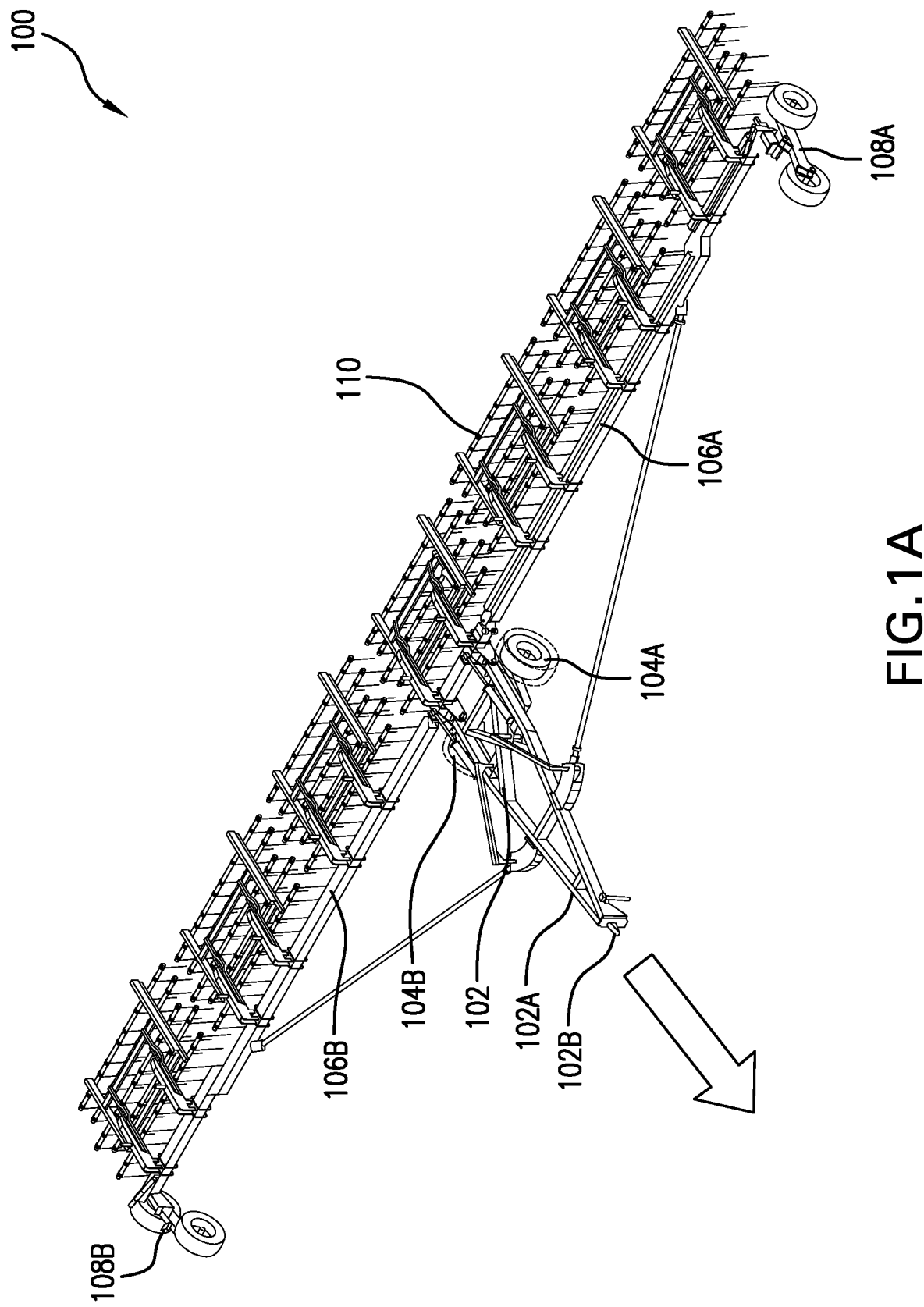
FIG. 1A is a simplified block diagram illustrating a perspective top view of a ground-engaging farm implement according to a preferred embodiment of the invention.
Figure 1B:
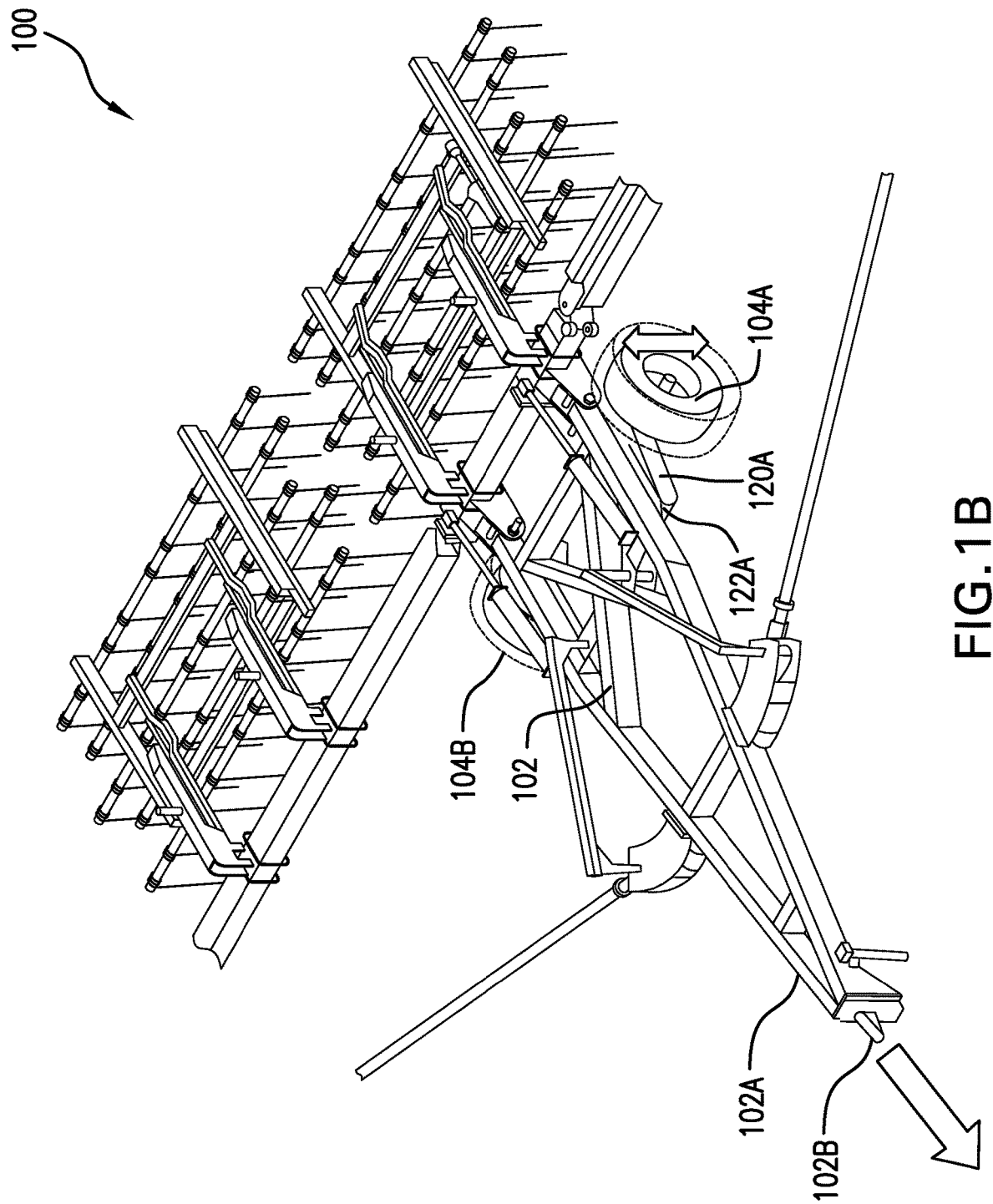
FIG. 1B is a simplified block diagram illustrating a perspective top view of a center portion of the ground-engaging farm implement according to a preferred embodiment of the invention.
Figure 1C:
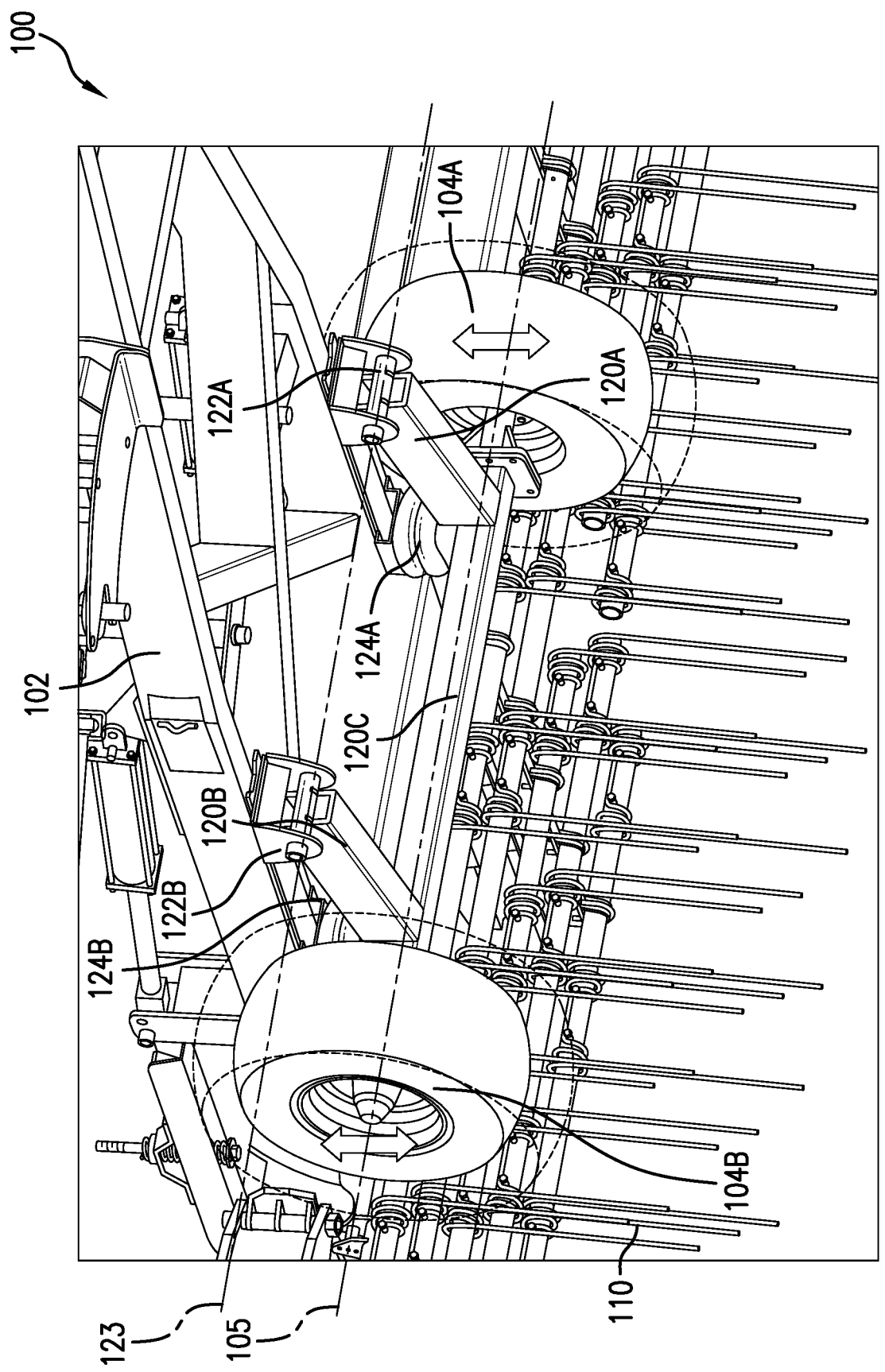
FIG. 1C is a simplified block diagram illustrating a perspective bottom view of a suspension of the ground-engaging farm implement according to a preferred embodiment of the invention.

The support wheels 104A and 104B are rotatably movable—about axis 105—mounted to wheel support structure 120A, 120B, 120C in a conventional manner, as illustrated in FIG. 1C. The wheel support structure, preferably, comprises a wheel connecting element 120C oriented parallel to the axis of rotation 105 of the support wheels 104A and 104B and two mounting arms 120A and 120B fixedly connected, for example, welded, to the wheel connecting element 120C and oriented substantially perpendicular thereto. The wheel support structure 120A, 120B, 120C is pivotally movable—about axis 123—mounted to the support frame 102 at pivots 122A and 122B in a conventional manner using, for example, a bolt accommodated in respective bores disposed in the wheel support structure and U-shaped mounting elements welded to the center frame 102. Preferably, the pivots 122A and 122B are placed between the axis of rotation 105 of the support wheels 104A and 104B and the front end portion 102A of the support frame 102. The pivotally movable mounted wheel support structure 120A, 120B, 120C enables the support wheels 104A and 104B to substantially vertically move a predetermined distance with respect to the support frame 102 when encountering un-even ground, as indicated by the block arrows in FIGS. 1B and 1C.

Preferably, the support frame 102, the extension wings 106A and 106B, and the wheel support structure 120A, 120B, 120C are made using rectangular Hollow Structural Sections (HSS) of steel which are connected using conventional welding techniques. The hub of each of the support wheels 104A and 104B is mounted to the wheel connecting element 120C via a conventional combination of an axle and an off-the-shelf bearing.

Suspension air bags 124A and 124B of an air suspension system are interposed between the support frame 102 and the wheel support structure 120A, 120B, 120C for controlling the vertical movement of the support wheels 104A and 104B. Preferably, each of the mounting arms 120A and 120B is placed in proximity to a respective support wheel 104A, 104B and the suspension air bags124A and 124B are placed in proximity to the respective mounting arm 120A, 120B.

Figure 1D:
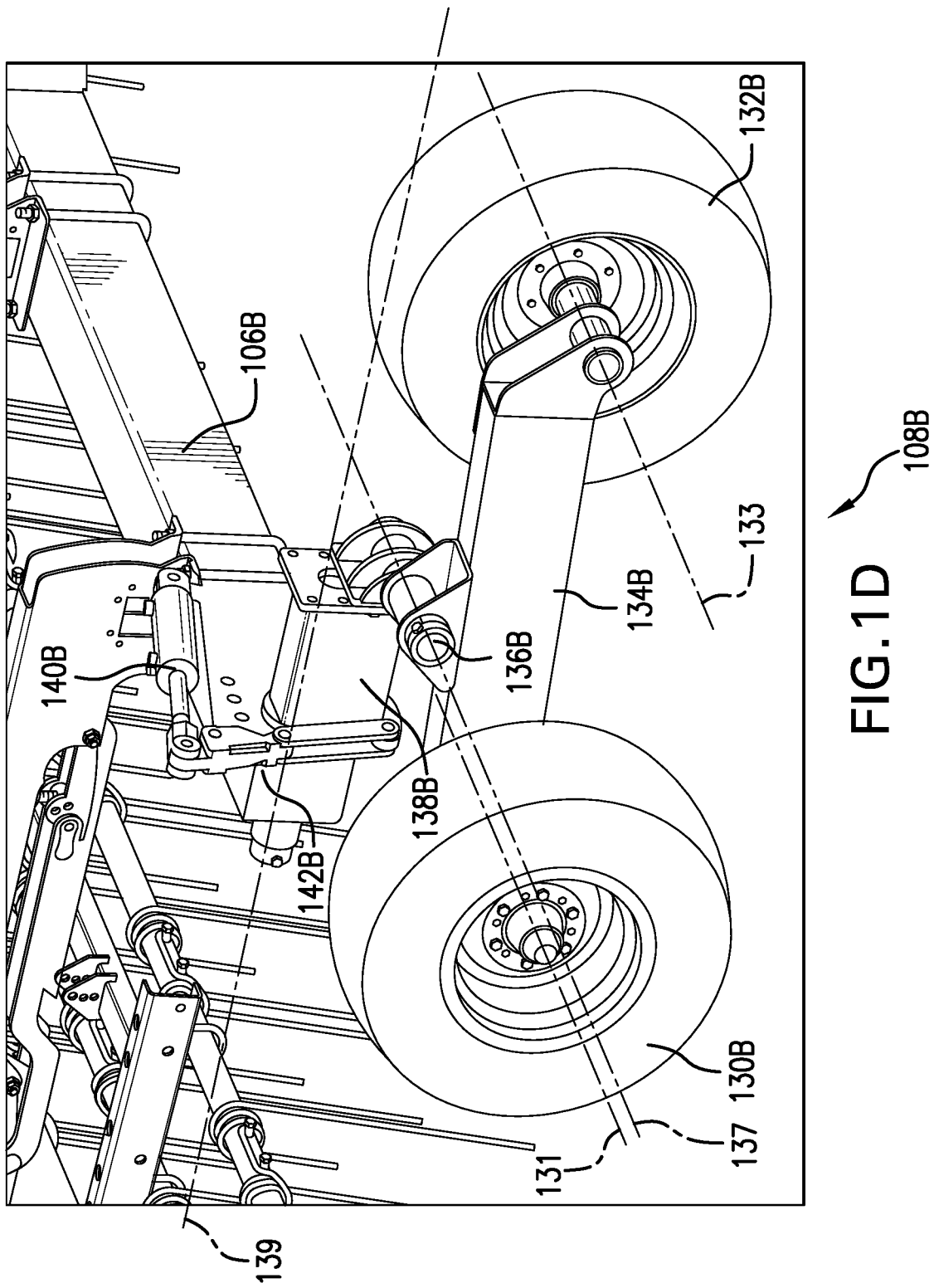
FIG. 1D is a simplified block diagram illustrating a perspective side view of a walking wheel arrangement of the ground-engaging farm implement according to a preferred embodiment of the invention.

In operation, the un-folded extension wings 106A and 106B are supported by walking wheel arrangements 108A and 108B, as illustrated in FIGS. 1A and 1D. Preferably, each walking wheel arrangement 108A, 108B comprises a front walking wheel 130A, 130B and a rear walking wheel 132A, 132B rotatably mounted—about axis 131, 133, respectively—to wheel support beam 134A, 134B, which is pivotally movable—about axis 137 oriented parallel to the axes 131 and 133—mounted at pivot 136A, 136B. The pivotally movable mounted wheel support beam 134A, 134B enables up/down movement of the walking wheels about the axis 137 when encountering un-even ground, thus reducing the "jumping" effect on the extension wings 106A and 106B. During storage and transport, the walking wheel arrangements 108A and 108B are folded upwardly by rotating the same about axis 139 using respective hydraulic cylinders 140A and 140B connected to lever mechanisms 138A, 142A and 138B, 142B.

Figure 1E:
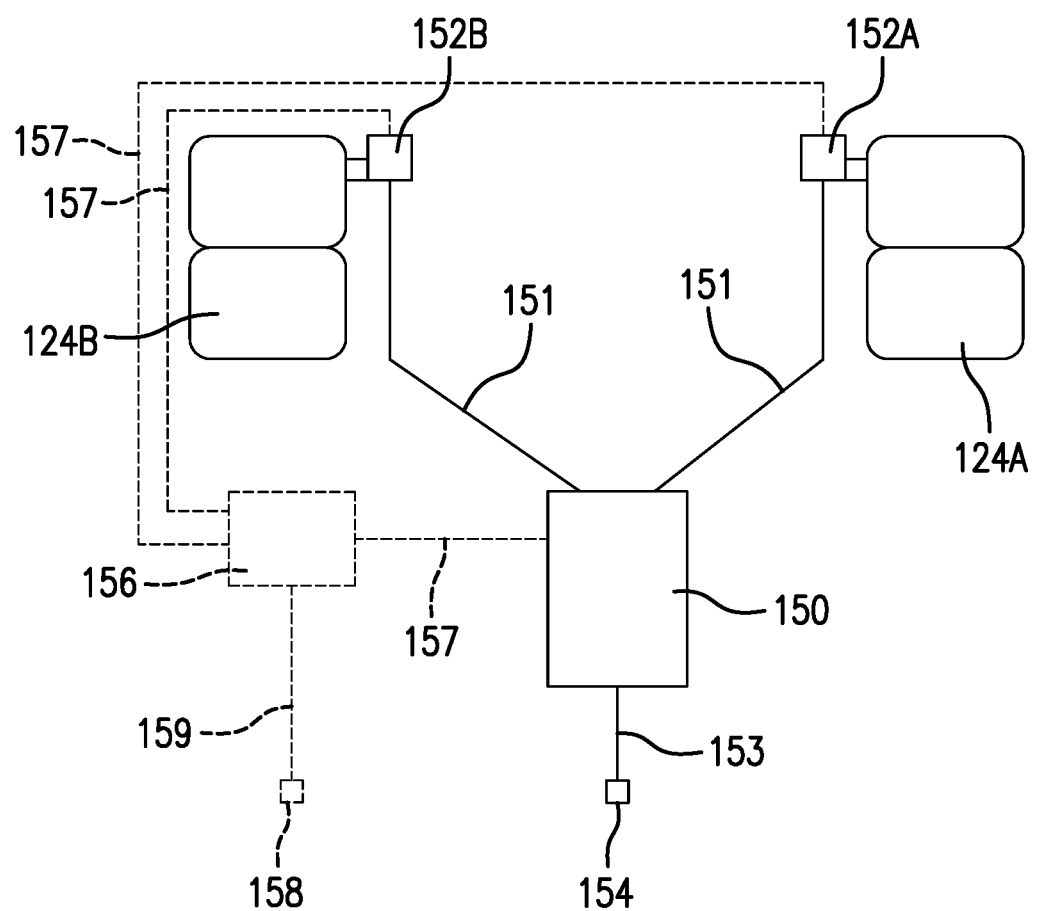
FIG. 1E is a simplified block diagram illustrating main components of an air suspension system employed in the ground-engaging farm implement according to a preferred embodiment of the invention.

Preferably, the air suspension system employed in the ground-engaging farm implement 100 is an off-the-shelf air suspension system chosen from a large variety of commercially available air suspension systems depending on, for example, the type and weight of the ground-engaging farm implement 100 and the desired complexity of functions to be performed by the air suspension system. Referring to FIG. 1E, the main components of the air suspension system employed in the ground-engaging farm implement 100 are: air compressor unit 150 providing compressed air to the suspension air bags 124A and 124B via compressed air lines 151; and, controller 156 connected to the air compressor unit 150 and solenoid vales 152A, 152B of the respective suspension air bags 124A, 124B via control lines 157.

The air compressor unit 150 comprises, for example, a conventional air compressor driven by an electric motor connected to the electrical system of the power unit—typically 12V DC—via power line 153 and coupler 154. Alternatively, the air compressor driven by a hydraulic drive connected to the hydraulic system of the power unit.

Controller 156 is, for example, a computer comprising a processor for executing commands stored in a non-volatile storage medium to determine control commands in dependence upon sensor signals received from pressure sensors and ride-height sensors (not shown) and to provide the same to the air compressor unit 150 and the solenoid vales 152A, 152B. The controller 156 is powered by the electrical system of the power unit—typically 12V DC—via power line 159 and coupler 158.

Figure 1F:
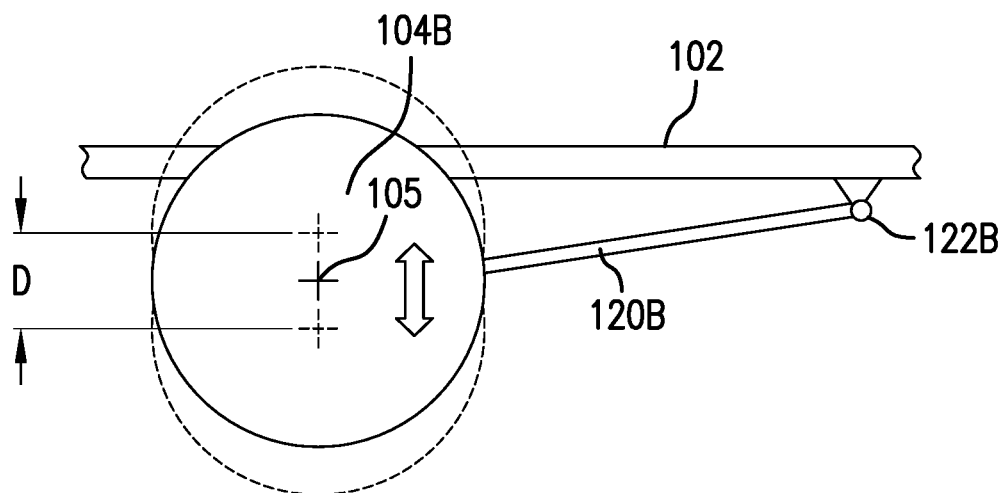
FIGS. 1F and 1G are simplified block diagrams illustrating in sectional side views modes of operation of the air suspension of the ground-engaging farm implement according to a preferred embodiment of the invention; and, FIGS. 2A to 2C are simplified block diagrams illustrating in top views alternative embodiments of wheel support structures of the ground-engaging farm implement according to a preferred embodiment of the invention.
Figure 1G:
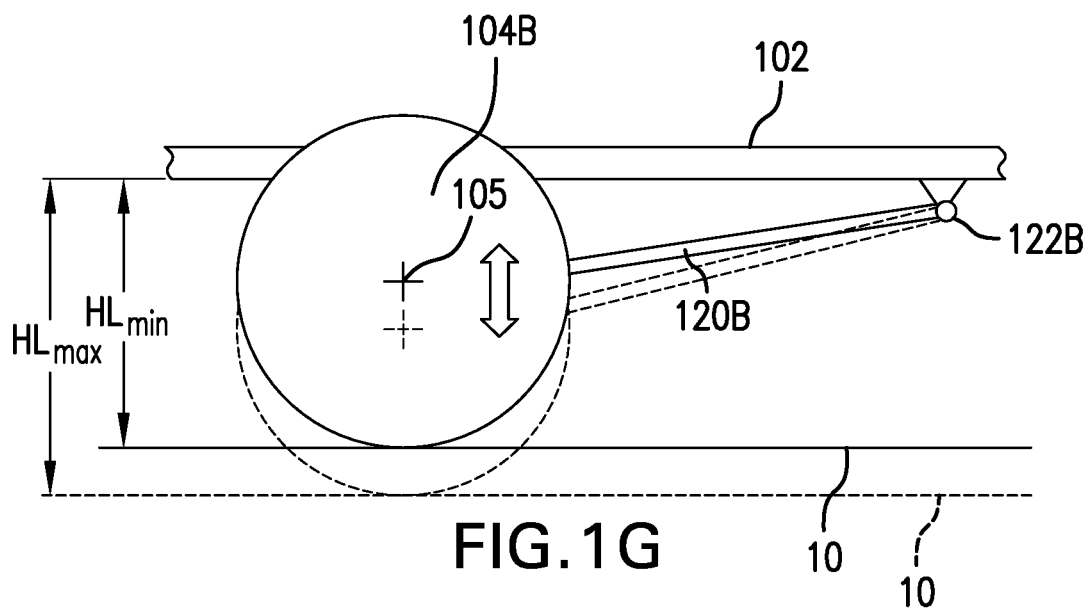

In operation, the controller 156 controls the substantially vertical movement of the support wheels 104A, 104B when encountering un-even ground within a predetermined distance D, as illustrated in FIG. 1F. Optionally, the controller 156 also controls adjustment of the air suspension to provide a predetermined level height of the support frame 102 above ground 10 in a predetermined range between a minimum level height $HL_{min}$ and a maximum level height $HL_{max}$, as illustrated in FIG. 1G.

Further optionally, the controller 156 comprises a user interface such as, for example, a touch screen to enable the operator to select a desired mode of operation of the air suspension system such as, for example, stiffness of the suspension, predetermined distance D, and level height HL of the support frame 102 above ground.

The employment of the air suspension system in the ground-engaging farm implement 100, as illustrated hereinabove, substantially improves the ride of the same, particularly, when encountering un-even ground, thus substantially reducing jumping and consequently substantially increasing the consistency of the ground contact of the ground-engaging tool 110. Substantially reduced jumping enables operation of the ground-engaging farm implement 100 at an increased speed compared to a ground-engaging farm implement absent air suspension.

The employment of the air suspension system in the ground-engaging farm implement 100 also enables additional functionalities such as, for example, adjustment of the stiffness of the suspension, predetermined distance D, and level height HL of the support frame 102 above ground in dependence upon the ground conditions and the mode of operation of the ground-engaging farm implement 100 such as depth of ground engagement of the ground-engaging tool.

Preferably, the components of the air suspension system are mounted to the support frame 102 in a conventional manner. For example, the suspension air bags 124A and 124B are mounted to the support frame 102 and the wheel support structure 120A, 120B, 120C using bolts.

The suspension of the support wheels 104A, 104B of the ground-engaging farm implement 100 described hereinabove suspends the support wheels 104A, 104B in a dependent manner, i.e. the support wheels 104A, 104B are rigidly connected to each other via wheel connecting element 120C. Therefore, when one support wheel encounters un-even ground it also causes the other support wheel to move in a substantially vertical direction.

Figure 2A:
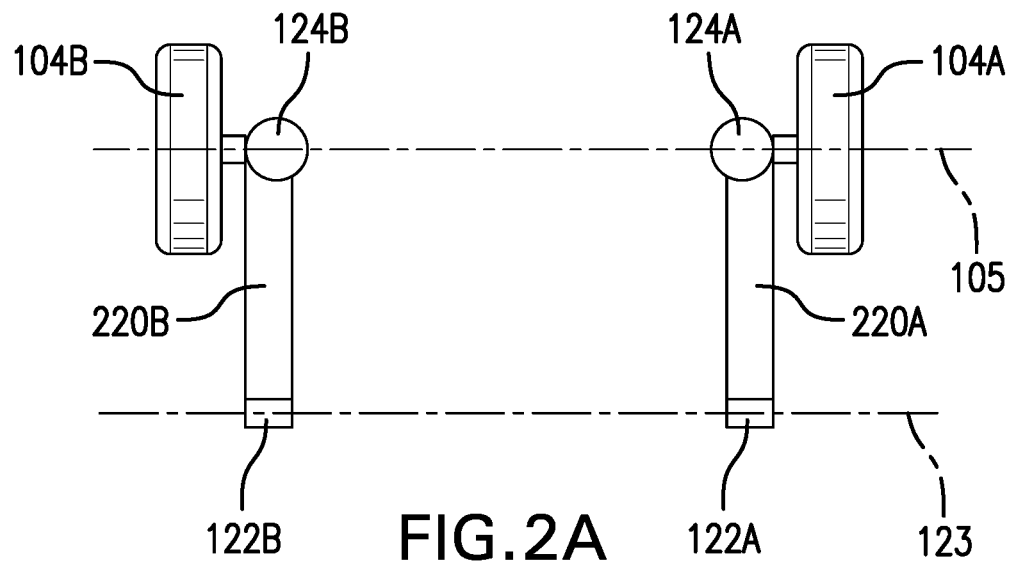

In an alternative embodiment, as illustrated in FIG. 2A, the wheel connecting element 120C is omitted and each support wheel 104A, 104B is directly mounted to a respective mounting arm 220A, 220B, resulting in an independent suspension of the support wheels 104A and 104B enabling each of the support wheels 104A and 104B to follow the ground independent from the other.

Figure 2B:
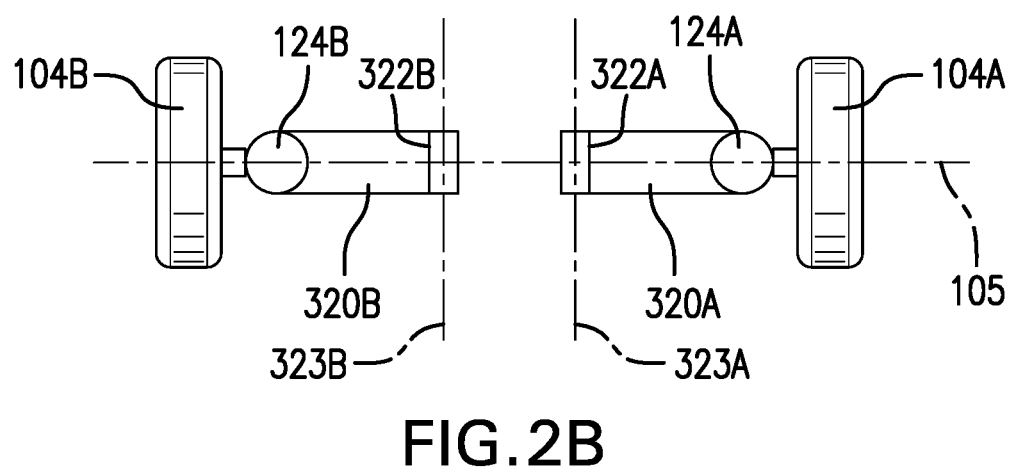

Further alternatively, as illustrated in FIG. 2B, mounting arms 320A and 320B are pivotally movable mounted to the support frame 102 at pivots 322A and 322B, having respective axes of rotation 323A and 323B oriented perpendicular to the axis of rotation 105 of the support wheels 104A and 104B.

In a further alternative embodiment the support frame 102 is supported by more than two support wheels, for example, four support wheels 404A.1, 404A.2, 404B.1, and 404B.2, as illustrated in FIG. 2C. Here, each mounting arm 220A, 220B has two support wheels mounted thereto.

The provision of cushioning suspension on the axles or ground support and we will support structure of a farm implement such as this allows for more consistent ground contact of the ground engaging tools on the implement, as well as allowing by virtue of its ability to cushion the movement of the structure in relation to the ground for increased ground speed of the implement.

The present invention has been described herein with regard to preferred embodiments. However, it will be obvious to persons skilled in the art that a number of variations and modifications can be made without departing from the scope of the invention as described herein.

What is claimed is:

1. A ground-engaging farm implement comprising:
a. a support frame, a front end portion of the support frame being adapted for being coupled to a power unit;
b. at least one ground-engaging tool mounted to the support frame;
c. two or more independently moveable assemblies each including:
(i) a wheel support structure comprising a single pivotable mounting arm having one or two support wheels rotatably mounted thereto on an axis of rotation extending through the mounting arm, the mounting arm being mounted to the support frame by a pivot such that the one or two support wheels are enabled to move a predetermined substantially vertical distance with respect to the support frame while the implement moves across a ground surface in a direction of travel, wherein the pivotable motion of the mounting arm of each of the moveable assemblies is not mechanically interconnected to any other of the mounting arms of the wheel support structure;
(ii) a suspension element interposed between the support frame and the wheel support structure, the suspension element configured to control the vertical movement behaviour of the related support wheel, wherein the suspension element comprises at least one air bag; and
d. a suspension control system comprising:
at least one of an air bag pressure sensor and a ride height sensor; and
a control unit;
wherein the control unit is configured to receive information from at least one of the air bag pressure sensor and the ride height sensor, and is configured to independently adjust the pressure each air bag to achieve at least one of a desired air bag pressure and a desired ride height.

2. The ground-engaging farm implement according to claim 1 wherein at least one of the wheel support structures is pivotally movable about an axis oriented parallel to an axis of rotation of the support wheel attached thereto.

3. The ground-engaging farm implement according to claim 1 wherein at least one of the wheel support structures is pivotally movable about an axis oriented substantially perpendicular to an axis of rotation of the support wheel attached thereto.

4. The ground-engaging farm implement according to claim 2 wherein at least one of the wheel support structures is pivotally movable mounted to the support frame at a location between the axis of rotation of the support wheel attached thereto and the front end portion of the support frame.

5. The ground-engaging farm implement according to claim 1 wherein the suspension elements further comprise springs.

6. The ground-engaging farm implement according to claim 1 wherein the suspension elements are adapted for changeably positioning the support frame a predetermined distance above ground.

7. The ground-engaging implement according to claim 1, wherein the suspension control system can be operated with the implement is in motion.

8. The ground-engaging implement according to claim 7, further comprising a user interface configured to permit an operator to select a desired mode of operation of the suspension control system.

9. The ground-engaging implement according to claim 8, wherein the desired mode of operation comprises at least one of suspensions stiffness, distance and level height of the support frame above the ground over which the implement is being operated.

10. The ground-engaging implement according to claim 9, wherein the level height is variable between a minimum level height and a maximum level height, while the implement is in motion.

* * * * *